US009149892B2

(12) United States Patent  
Liebert et al.

(10) Patent No.: US 9,149,892 B2
(45) Date of Patent: Oct. 6, 2015

(54) WELDING POWER SUPPLY ROLL CAGE WITH INCORPORATED LIFT HANDLES

(71) Applicant: Illinois Tool Works Inc., Glenview, IL (US)

(72) Inventors: Scott Stephen Liebert, Freedom, WI (US); Markus Michael Dantinne, Combined Locks, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 197 days.

(21) Appl. No.: 13/910,763

(22) Filed: Jun. 5, 2013

(65) Prior Publication Data

US 2014/0042134 A1   Feb. 13, 2014

Related U.S. Application Data

(60) Provisional application No. 61/682,093, filed on Aug. 10, 2012.

(51) Int. Cl.
```
B23K 37/00      (2006.01)
B23K 9/32       (2006.01)
B23K 37/02      (2006.01)
B62B 3/16       (2006.01)
B62B 3/10       (2006.01)
F02B 63/04      (2006.01)
F16M 3/00       (2006.01)
```
(52) U.S. Cl.
CPC . *B23K 37/00* (2013.01); *B23K 9/32* (2013.01); *B23K 37/0294* (2013.01); *B62B 3/10* (2013.01); *B62B 3/16* (2013.01); *F02B 63/04* (2013.01); *F16M 3/00* (2013.01)

(58) Field of Classification Search
CPC ... B23K 9/1006; F02B 63/04; F02B 2063/00; F02B 2063/45; F02B 2063/47

USPC .......................................................... 219/133
See application file for complete search history.

(56) References Cited

U.S. PATENT DOCUMENTS

| | | | |
|---|---|---|---|
| D588,987 S | * | 3/2009 | Kato ............................ D13/116 |
| 2010/0084387 A1 | * | 4/2010 | Bender et al. ................. 219/133 |
| 2010/0147816 A1 | * | 6/2010 | Laitala .......................... 219/133 |
| 2011/0204013 A1 | | 8/2011 | Lahti |

FOREIGN PATENT DOCUMENTS

| | | |
|---|---|---|
| CN | 201982897 | 9/2011 |
| JP | 2002290061 | 10/2002 |

OTHER PUBLICATIONS

International Search Report from PCT application No. PCT/US2013/053535 dated Dec. 2, 2013, 11 pgs.

* cited by examiner

*Primary Examiner* — Brian Jennison
(74) *Attorney, Agent, or Firm* — Fletcher Yoder P.C.

(57) ABSTRACT

A welding power supply unit includes an outer enclosure having a plurality of sides that encompass internal components of the welding power supply unit. The welding power supply unit also includes a roll cage assembly having a plurality of roll bars. Each roll bar is disposed generally parallel with, but not adjacent to, an edge of a side of the outer enclosure and external to the outer enclosure. At least two of the roll bars are associated with handle portions that rotate with respect to the respective roll bar. Each handle portion includes an extruded tubular aluminum bracket or a die cast aluminum bracket disposed around its respective roll bar. In addition, the welding power supply unit includes a plurality of fastening mechanisms attached to the outer enclosure, the fastening mechanisms securing the roll cage assembly to the outer enclosure.

19 Claims, 8 Drawing Sheets

WELDING POWER SUPPLY ROLL CAGE WITH INCORPORATED LIFT HANDLES

CROSS-REFERENCE TO RELATED APPLICATIONS

This application is a Non-Provisional patent application of U.S. Provisional Patent Application No. 61/682,093, entitled "Welding Power Supply Roll Cage with Incorporated Lift Handles", filed on Aug. 10, 2012, which is herein incorporated by reference in its entirety for all purposes.

BACKGROUND

The present invention relates generally to the field of welding systems, and more particularly to a welding power supply unit that includes a roll cage assembly with incorporated lift handles.

Welding systems and power supplies are frequently used in harsh environments where they may be exposed to debris, dust, and other deposits that can harm or damage the welding power supplies. Similarly, common welding environments may include exposure to vibrating and mechanical tools, contact with which could damage a welding power supply. In addition, welding systems and power supplies are often subject to excessive handling and transportation requirements. Furthermore, welding power supplies, which may weigh over 80 pounds, are frequently difficult and cumbersome to transport or reposition.

BRIEF DESCRIPTION

In an embodiment, a welding power supply unit includes an outer enclosure having a plurality of sides that encompass internal components of the welding power supply unit. The welding power supply unit also includes a roll cage assembly having a plurality of roll bars. Each roll bar is disposed generally parallel with, but not adjacent to, an edge of a side of the outer enclosure and external to the outer enclosure. In addition, the welding power supply unit includes a plurality of fastening mechanisms attached to the outer enclosure, the fastening mechanisms securing the roll cage assembly to the outer enclosure.

In another embodiment, a welding power supply unit includes an outer enclosure having a plurality of sides that encompass internal components of the welding power supply unit. The welding power supply unit also includes a roll cage assembly having a plurality of roll bars. Each roll bar is disposed generally parallel with, but not adjacent to, an edge of a side of the outer enclosure and external to the outer enclosure. At least two of the roll bars are associated with handles that rotate with respect to the respective roll bar. Each handle includes an extruded tubular aluminum bracket or a die cast aluminum bracket disposed around its respective roll bar. In addition, the welding power supply unit includes a plurality of fastening mechanisms attached to the outer enclosure, the fastening mechanisms securing the roll cage assembly to the outer enclosure.

In yet another embodiment, a welding power supply unit includes an outer enclosure having a plurality of sides that encompass internal components of the welding power supply unit. The plurality of sides includes a plurality of lateral sides, a top side, and a bottom side. Each of the lateral sides and top side comprise a plurality of rolled ribs extending lengthwise along an outer surface of the side. The welding power supply unit also includes a roll cage assembly having a plurality of roll bars. Each roll bar is disposed generally parallel with, but not adjacent to, an edge of a side of the outer enclosure and external to the outer enclosure. At least two of the roll bars are associated with handles that rotate with respect to the respective roll bar. Each handle includes an extruded tubular aluminum bracket or a die cast aluminum bracket disposed around its respective roll bar. In addition, the welding power supply unit includes a plurality of fastening mechanisms attached to the outer enclosure, the fastening mechanisms securing the roll cage assembly to the outer enclosure. The welding power supply unit further includes a plurality of struts, each strut extending vertically along a lateral side between a fastening mechanism disposed on the top side and a fastening mechanism disposed on the bottom side. Each strut comprises a rolled rib extending lengthwise along an outer surface of the strut. In addition, the welding power supply unit includes a stop mechanism configured to constrain rotation of a handle between a horizontal position adjacent to the top side and a vertical position generally perpendicular to the top side.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in greater detail below, in certain embodiments, a welding power supply unit includes a roll cage assembly with incorporated lift handles. As described above, welding power supply units are often subject to excessive handling and transportation requirements. The embodiments described herein address these concerns by providing a welding power supply unit capable of withstanding more abuse than conventional welding power supply units. The roll cage assembly described herein protects the sheet metal enclosure and operator interface of the welding power supply unit. In addition, the roll cage assembly described herein includes a plurality of incorporated lift handles. In certain embodiments, these incorporated lift handles are constructed from the same materials (e.g., tubular aluminum) as the roll bars of the roll cage assembly. The roll cage assembly described herein also enhances the structural integrity of the enclosure of the welding power supply unit by, for example, tying a top portion of the welding power supply unit to a bottom portion of the welding power supply unit with vertical struts.

Figure 1:
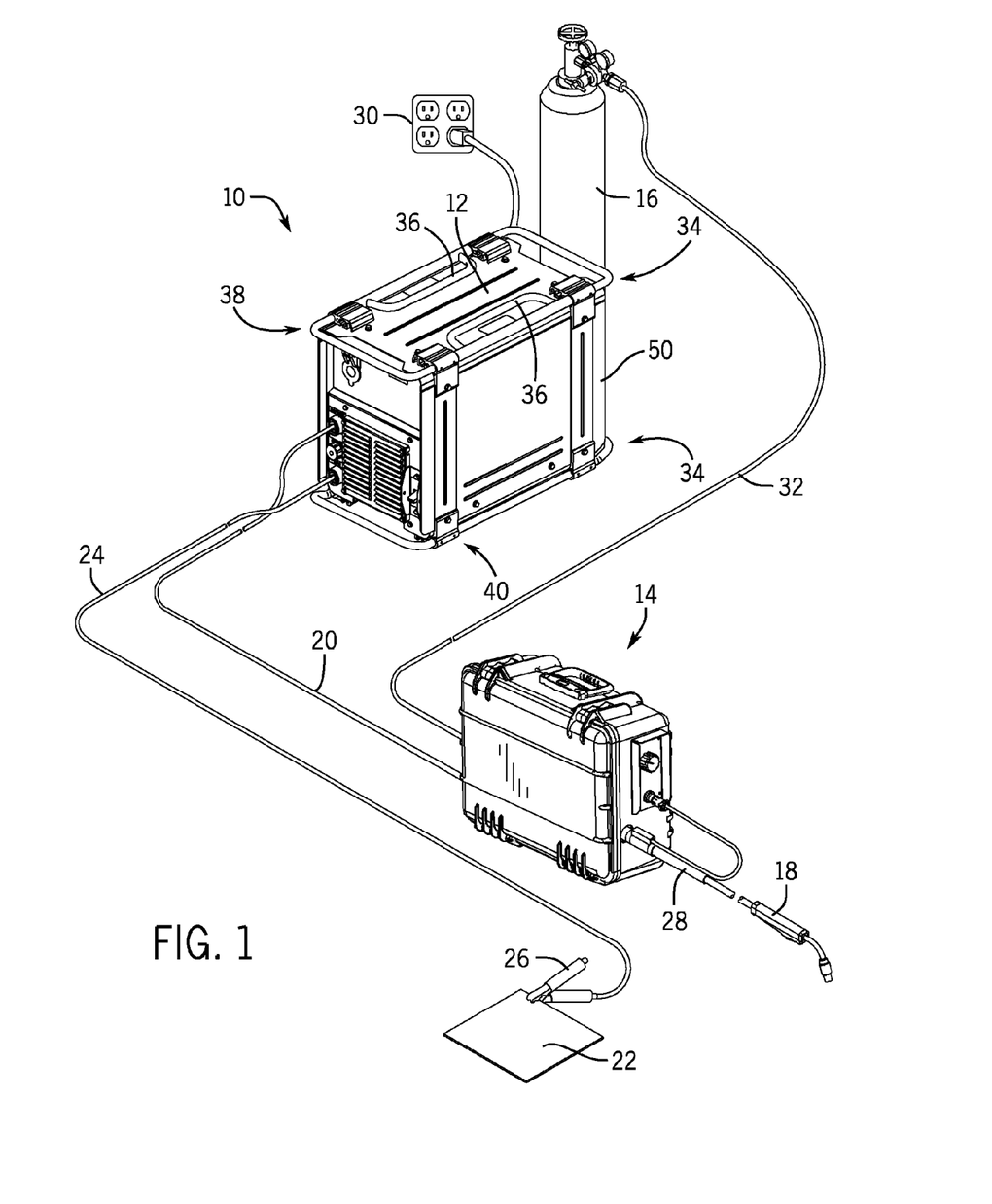
FIG. 1 is a diagram of an embodiment of a welding system that includes a welding power supply unit having a roll cage with incorporated lift handles, in accordance with certain embodiments of the present disclosure.

Turning to the figures, FIG. 1 is a diagram of an embodiment of a welding system 10 that includes a welding power supply unit 12 having a roll cage assembly with incorporated lift handles, in accordance with certain embodiments of the present disclosure. It should be appreciated that, while the welding system 10 described herein is specifically presented as a gas metal arc welding (GMAW) system 10, the presently disclosed techniques may also be used with other arc welding processes (e.g., FCAW, FCAW-G, GTAW, SAW, SMAW, or similar arc welding processes). The welding system 10 includes the welding power supply unit 12, a welding wire feeder 14, a gas supply system 16, and a welding torch 18. The welding power supply unit 12 generally supplies power to the welding system 10 and other various accessories, and may be coupled to the welding wire feeder 14 via a weld cable 20 as well as to a workpiece 22 using a lead cable 24 having a clamp 26. In the illustrated embodiment, the welding wire feeder 14 is coupled to the welding torch 18 via a weld cable 28 in order to supply welding wire and power to the welding torch 18 during operation of the welding system 10. In another embodiment, the welding power supply unit 12 may couple and directly supply power to the welding torch 18.

In the embodiment illustrated in FIG. 1, the welding power supply unit 12 may generally include power conversion circuitry that receives input power from an alternating current power source 30 (e.g., the AC power grid, an engine/generator set, or a combination thereof), conditions the input power, and provides DC or AC output power via the weld cable 20. As such, the welding power supply unit 12 may power the welding wire feeder 14 that, in turn, powers the welding torch 18, in accordance with demands of the welding system 10. The lead cable 24 terminating in the clamp 26 couples the welding power supply unit 12 to the workpiece 22 to close the circuit between the welding power supply unit 12, the workpiece 22, and the welding torch 18. The welding power supply unit 12 may include circuit elements (e.g., transformers, rectifiers, switches, and so forth) capable of converting the AC input power to a direct current electrode positive (DCEP) output, direct current electrode negative (DCEN) output, DC variable polarity, or a variable balance (e.g., balanced or unbalanced) AC output, as dictated by the demands of the welding system 10 (e.g., based on the type of welding process performed by the welding system 10, and so forth).

The illustrated welding system 10 also includes a gas supply system 16 that supplies a shielding gas or shielding gas mixtures to the welding torch 18. In the depicted embodiment, the gas supply system 16 is coupled to the welding wire feeder 14 via a gas conduit 32, and the welding wire feeder 14 regulates the flow of gas from the gas supply system 16 to the welding torch 18. In another embodiment, the gas supply system 16 may instead be coupled to the welding torch 18 via a gas conduit that is part of the weld cable 20 from the welding power supply unit 12. Regardless, a shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

As illustrated in FIG. 1, the welding power supply unit 12 includes a roll cage assembly 34 that enables the welding power supply unit 12 to withstand more abuse than conventional welding power supply units. In particular, the roll cage assembly 34 absorbs most of the jostling and vibration that may occur during handling and transportation of the welding power supply unit 12. In addition, as described in greater detail below, the roll cage assembly 34 comprises a plurality of incorporated lift handles 36 that facilitate handling and transportation of the welding power supply unit 12. For example, in certain embodiments, two incorporated lift handles 36 may be located on opposite lateral sides of the welding power supply unit 12, facilitating lifting by two people on opposite sides of the welding power supply unit 12. FIGS. 2 through 9 illustrate more details of the roll cage assembly 34 described herein.

Figure 2:
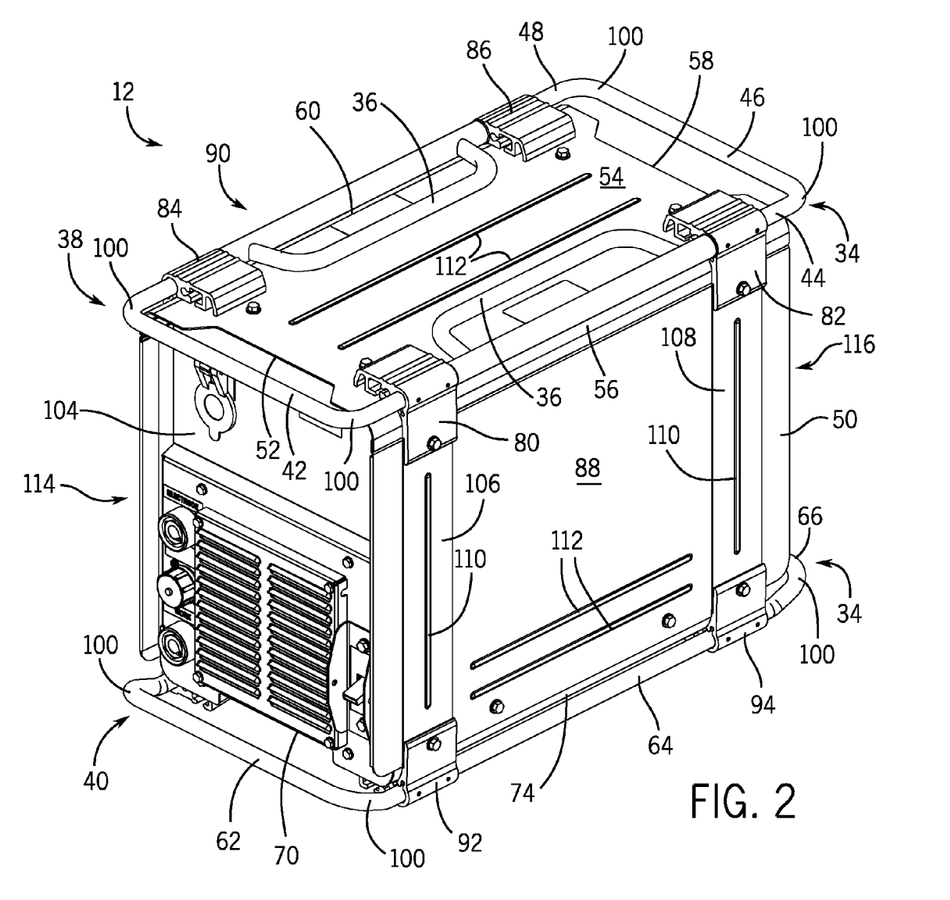
FIG. 2 is a front right top perspective view of the welding power supply unit of FIG. 1, in accordance with certain embodiments of the present disclosure.

For example, as illustrated in FIG. 2, the roll cage assembly 34 includes a top roll cage section 38 and a bottom roll cage section 40. In general, the top roll cage section 38 includes a plurality of top roll bars 42, 44, 46, 48, each of which is disposed generally parallel with, but not directly adjacent to, an edge of a side of an outer enclosure 50 of the welding power supply unit 12, wherein the outer enclosure 50 encompasses the internal components of the welding power supply unit 12. For example, a front top roll bar 42 of the top roll cage section 38 is disposed generally parallel to a front edge 52 of a top side 54 of the outer enclosure 50 of the welding power supply unit 12, a right top roll bar 44 of the top roll cage section 38 is disposed generally parallel to a right edge 56 of the top side 54 of the outer enclosure 50 of the welding power supply unit 12, a rear top roll bar 46 of the top roll cage section 38 is disposed generally parallel to a rear edge 58 of the top side 54 of the outer enclosure 50 of the welding power supply unit 12, and a left top roll bar 48 of the top roll cage section 38 is disposed generally parallel to a right edge 60 of the top side 54 of the outer enclosure 50 of the welding power supply unit 12, with each top roll bar 42, 44, 46, 48 being disposed external to the outer enclosure 50 by some distance from (i.e., not directly adjacent to) the nearest edge of the top side 54 of the outer enclosure 50 of the welding power supply unit 12.

Figure 3:
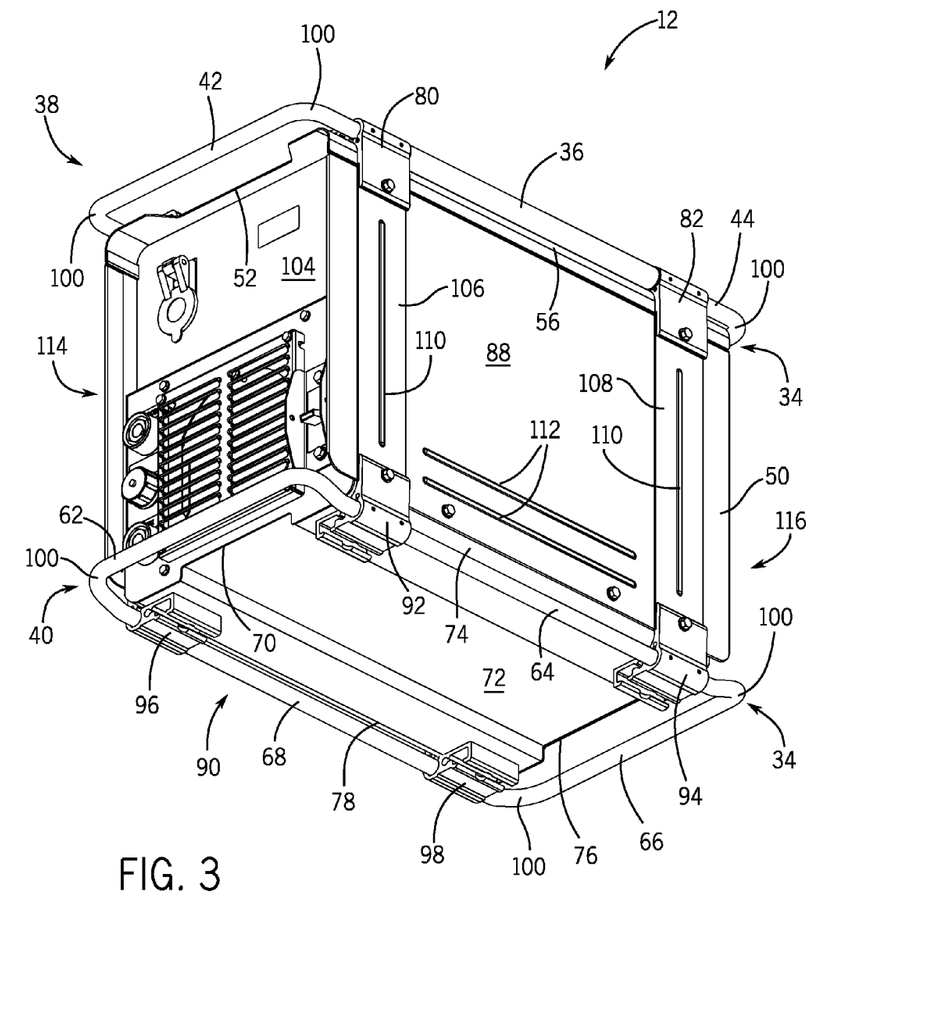
FIG. 3 is a front right bottom perspective view of the welding power supply unit of FIG. 1, in accordance with certain embodiments of the present disclosure.

Similarly, as illustrated in FIG. 3, the bottom roll cage section 40 includes a plurality of bottom roll bars 62, 64, 66, 68, each of which is disposed generally parallel with, but not directly adjacent to, an edge of a side of the outer enclosure 50 of the welding power supply unit 12. For example, a front bottom roll bar 62 of the bottom roll cage section 40 is disposed generally parallel to a front edge 70 of a bottom side 72 of the outer enclosure 50 of the welding power supply unit 12, a right bottom roll bar 64 of the bottom roll cage section 40 is disposed generally parallel to a right edge 74 of the bottom side 72 of the outer enclosure 50 of the welding power supply unit 12, a rear bottom roll bar 66 of the bottom roll cage section 40 is disposed generally parallel to a rear edge 76 of the bottom side 72 of the outer enclosure 50 of the welding power supply unit 12, and a left bottom roll bar 68 of the bottom roll cage section 40 is disposed generally parallel to a right edge 78 of the bottom side 72 of the outer enclosure 50 of the welding power supply unit 12, with each bottom roll bar 62, 64, 66, 68 being disposed external to the outer enclosure 50 by some distance from (i.e., not directly adjacent to) the nearest edge of the bottom side 72 of the outer enclosure 50 of the welding power supply unit 12.

In general, a plurality of top fastening mechanisms 80, 82, 84, 86 are attached to the top side 54 and a lateral side 88, 90 of the outer enclosure 50 of the welding power supply unit 12, and secure the top roll bars 42, 44, 46, 48 (and, thus, the top roll cage section 38) to the outer enclosure 50 of the welding power supply unit 12. For example, as illustrated in FIG. 2, in certain embodiments, two right top fastening mechanisms 80, 82 are attached to the top side 54 and a right lateral side 88 of the outer enclosure 50 of the welding power supply unit 12, and the right top roll bar 44 is secured within the right top fastening mechanisms 80, 82, thus securing the right top roll bar 44 to the outer enclosure 50 of the welding supply unit 12. Similarly, in certain embodiments, two left top fastening mechanisms 84, 86 are attached to the top side 54 and a left lateral side 90 of the outer enclosure 50 of the welding power supply unit 12, and the left top roll bar 48 is secured within the left top fastening mechanisms 84, 86, thus securing the left top roll bar 48 to the outer enclosure 50 of the welding supply unit 12.

Similarly, a plurality of bottom fastening mechanisms 92, 94, 96, 98 are attached to the bottom side 72 and a lateral side 88, 90 of the outer enclosure 50 of the welding power supply unit 12, and secure the bottom roll bars 62, 64, 66, 68 (and, thus, the bottom roll cage section 40) to the outer enclosure 50 of the welding power supply unit 12. For example, as illustrated in FIG. 3, in certain embodiments, two right bottom fastening mechanisms 92, 94 are attached to the bottom side 72 and the right lateral side 88 of the outer enclosure 50 of the welding power supply unit 12, and the right bottom roll bar 64 is secured within the right bottom fastening mechanisms 92, 94, thus securing the right bottom roll bar 64 to the outer enclosure 50 of the welding supply unit 12. Similarly, in certain embodiments, two left bottom fastening mechanisms 96, 98 are attached to the bottom side 72 and the left lateral side 90 of the outer enclosure 50 of the welding power supply unit 12, and the left bottom roll bar 68 is secured within the left bottom fastening mechanisms 96, 98, thus securing the left bottom roll bar 68 to the outer enclosure 50 of the welding supply unit 12.

In certain embodiments, the fastening mechanisms 80, 82, 84, 86, 92, 94, 96, 98 described herein may be extruded elastomeric material pieces having the particular features (e.g., extruded leg portions, and so forth) illustrated in FIGS. 2-9. In addition, in certain embodiments, the bottom fastening mechanisms 92, 94, 96, 98 are configured to mate with mounting brackets, which are used to mount the welding power supply unit 12 to a rack. As such, when the mounting brackets are attached to the rack, they do not intrude upon the outer enclosure 50 of the welding power unit 12.

The right and left roll bars 44, 48, 64, 68 fit securely within cylindrical inner volumes of the respective fastening mechanisms 80, 82, 84, 86, 92, 94, 96, 98. More specifically, in certain embodiments, the roll bars 42, 44, 46, 48, 62, 64, 66, 68 are all tubular members (e.g., tubular aluminum structures) such that the right and left roll bars 44, 48, 64, 68 may fit within the inner volumes of the respective fastening mechanisms 80, 82, 84, 86, 92, 94, 96, 98. In general, the roll bars 42, 44, 46, 48, 62, 64, 66, 68 are permanently fixed to adjacent roll bars 42, 44, 46, 48, 62, 64, 66, 68 of their respective roll cage section 38, 40. As illustrated in FIGS. 2 and 3, in certain embodiments, adjacent roll bars 42, 44, 46, 48, 62, 64, 66, 68 may be attached to each other via rounded edges 100 such that the roll bars 42, 44, 46, 48, 62, 64, 66, 68 form a continuous roll bar member. For example, the top roll bars 42, 44, 46, 48 may form a continuous roll bar member of the top roll cage section 38, and the bottom roll bars 62, 64, 66, 68 may form a continuous roll bar member of the bottom roll cage section 40.

Figure 4:
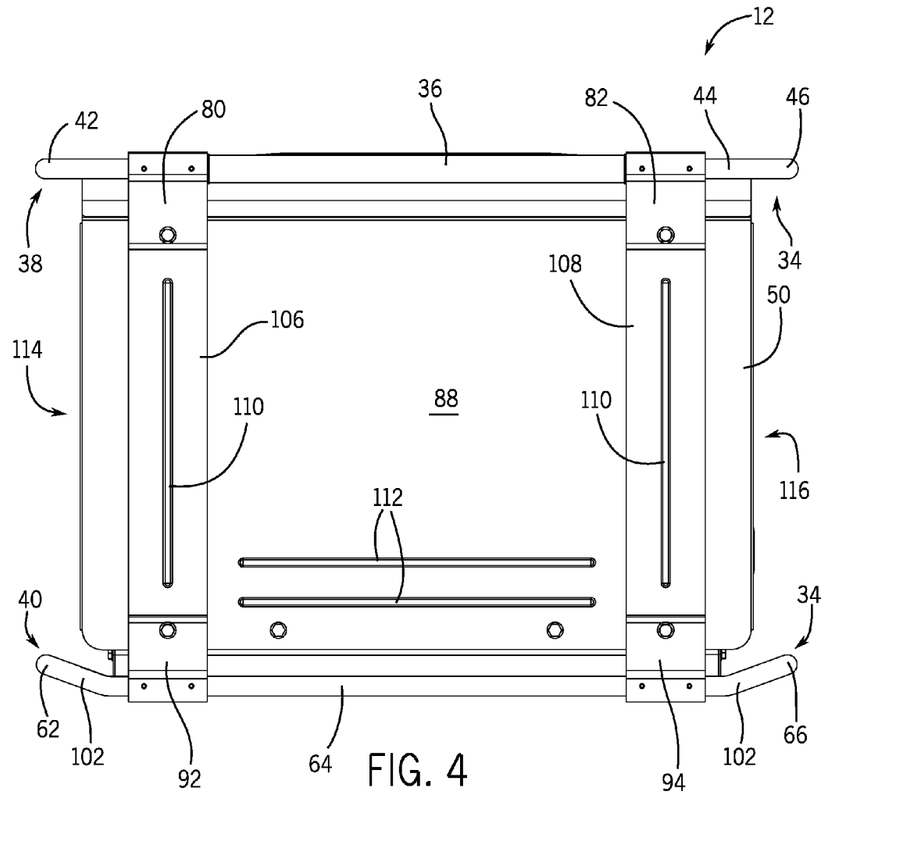
FIG. 4 is a side view of the welding power supply unit of FIG. 1, in accordance with certain embodiments of the present disclosure.
Figures 5, 6:
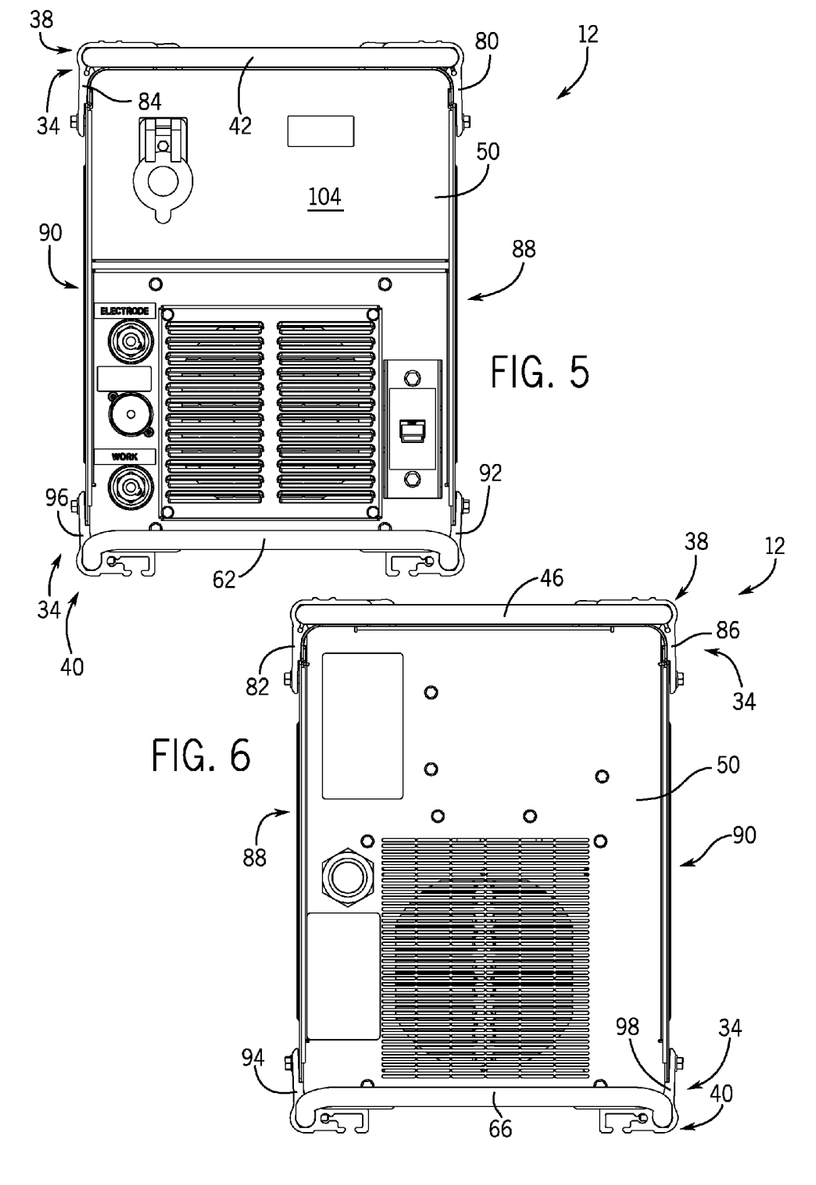
FIG. 5 is a front view of the welding power supply unit of FIG. 1, in accordance with certain embodiments of the present disclosure.
FIG. 6 is a rear view of the welding power supply unit of FIG. 1, in accordance with certain embodiments of the present disclosure.
Figure 7:
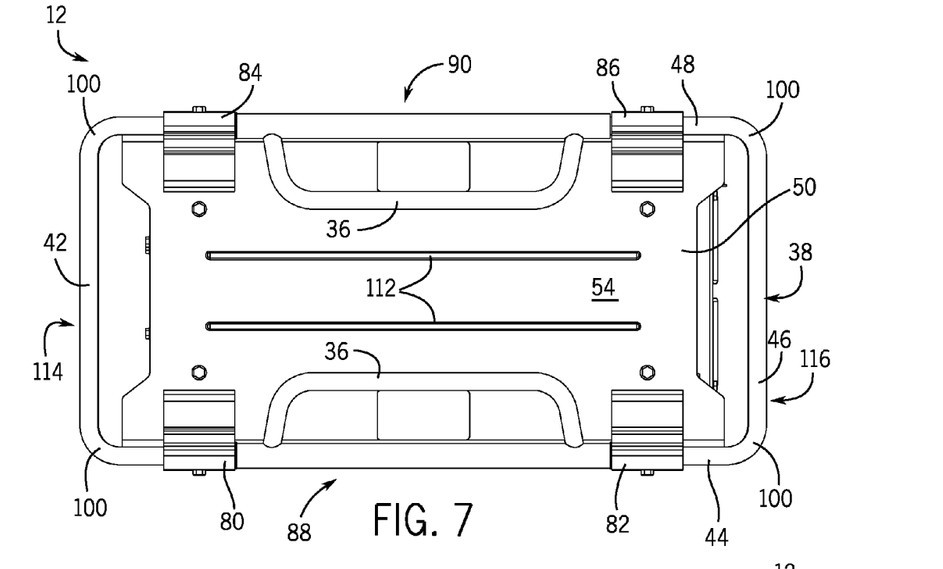
FIG. 7 is a top view of the welding power supply unit of FIG. 1, in accordance with certain embodiments of the present disclosure.
Figure 8:
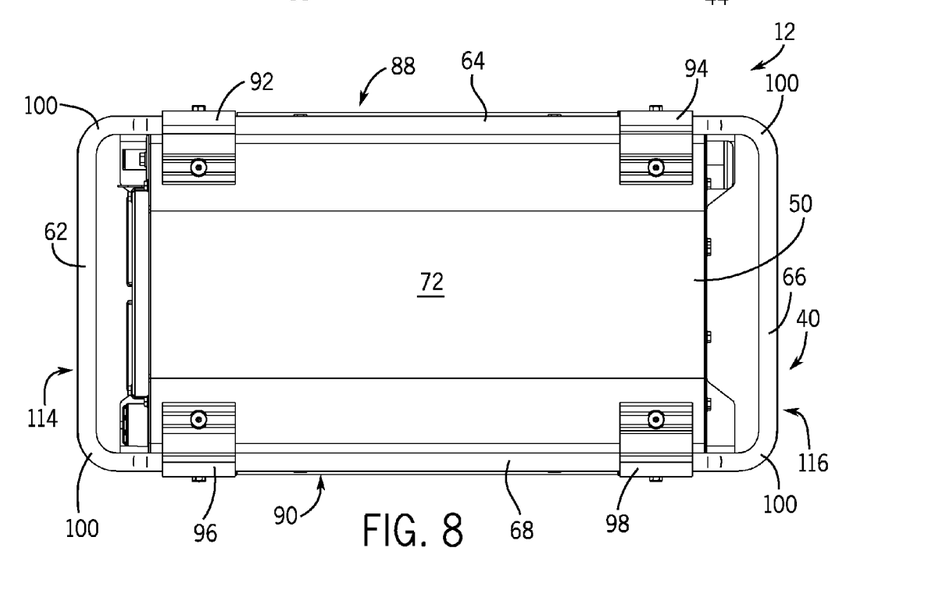
FIG. 8 is a bottom view of the welding power supply unit of FIG. 1, in accordance with certain embodiments of the present disclosure.

In addition, as illustrated in FIG. 4, in certain embodiments, the right and left bottom roll bars 64, 68 may both be connected to the front and rear bottom roll bars 62, 66 via transition joints 102 that extend at a non-orthogonal angle (e.g., approximately 15-20 degrees, in certain embodiments) with respect to the nearest respective edges of the bottom side 72 of the outer enclosure 50 of the welding power supply unit 12. More specifically, the transition joints 102 extend slightly upward from the right and left bottom roll bars 64, 68 to the front and rear bottom roll bars 62, 66. This eliminates pinch points of the front and rear bottom roll bars 62, 66, and enables users to slide their hands underneath the front and rear bottom roll bars 62, 66, facilitating lifting of the welding power supply unit 12 via the roll cage assembly 34.

As described above, the roll cage assembly 34 protects the outer enclosure 50, which may be comprised of sheet metal in certain embodiments, and an operator interface 104 of the welding power supply unit 12 from excessive abuse during handling, transportation, and general use of the welding power supply unit 12. In addition, the roll cage assembly 34 described herein enhances the structural integrity of the outer enclosure 50 of the welding power supply unit 12 by, for example, tying the top roll cage section 38 of the roll cage assembly 34 to the bottom roll cage section 40 of the roll cage assembly 34 via vertical struts 106, 108. As such, the vertical struts 106, 108 facilitate the transfer of loads from the top roll cage section 38 to the bottom roll cage section 40, thereby reducing the forces that are experienced by the outer enclosure 50 of the welding power supply unit 12. For example, in certain embodiments, two right side vertical struts 106, 108 extend vertically along the right lateral side 88 of the outer enclosure 50 between a fastening mechanism 80, 82, respectively, attached to the top side 54 of the outer enclosure 50 and a fastening mechanism 92, 94, respectively, attached to the bottom side 72 of the outer enclosure 50. In addition, although not illustrated in the figures, in certain embodiments, the left lateral side 90 includes similar vertical struts. In general, the vertical struts 106, 108 are made of relatively thin material (e.g., slightly thicker than the sheet metal used for the outer enclosure 50, in certain embodiments), thereby having a minimal projection from the outer enclosure 50 and not increasing the width or weight of the welding power supply unit 12 significantly.

In certain embodiments, each of the vertical struts 106, 108 includes a rolled rib 110 extending lengthwise (e.g., from the top side 54 of the outer enclosure 50 to the bottom side 72 of the outer enclosure 50) along an outer surface of the vertical strut 106, 108. The rolled ribs 110 generally add stiffness to the vertical struts 106, 108, as well as enhancing the aesthetic appearance of the welding power supply unit 12. Similarly, in certain embodiments, the top side 54, right lateral side 88, and left lateral side 90 may each include a plurality of rolled ribs 112 extending lengthwise (e.g., from a front side 114 of the outer enclosure 50 to a rear side 116 of the outer enclosure 50) along an outer surface of the sides 54, 88, 90. Again, the rolled ribs 112 add stiffness to the outer enclosure 50, as well as enhancing the aesthetic appearance of the welding power supply unit 12.

Figure 9:
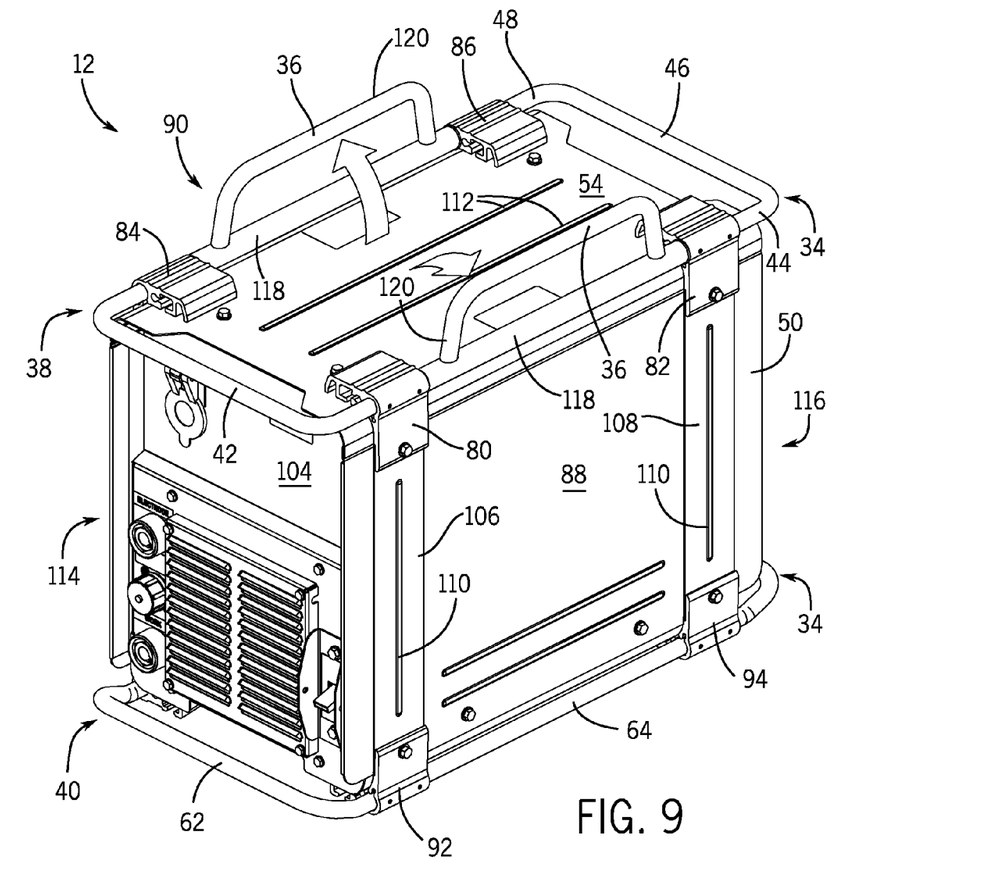
FIG. 9 is a front right top perspective view of the welding power supply unit of FIG. 1 with the incorporated lift handles in a generally vertical position, in accordance with certain embodiments of the present disclosure.
Figure 10:
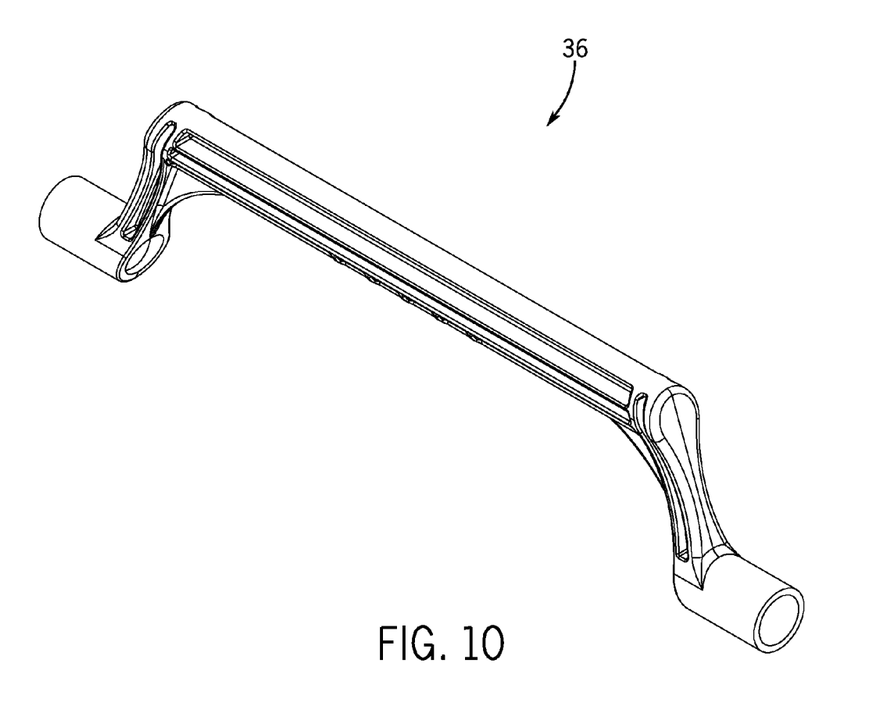
FIG. 10 is a perspective view of a die cast aluminum bracket incorporated lift handle, in accordance with certain embodiments of the present disclosure.

In addition, as illustrated in FIG. 9, the incorporated lift handles 36 are configured to rotate upward from a resting position, which is generally horizontal (i.e., parallel with and adjacent to the top side 54 of the outer enclosure 50). In certain embodiments, the incorporated lift handles 36 may each include an extruded tubular aluminum bracket disposed around its respective top roll bar 44, 48. For example, tubular portions 118 of the incorporated lift handles 36 are disposed about the generally tubular right and left top roll bars 44, 48, thereby enabling the incorporated lift handles 36 to be rotated with respect to the right and left top roll bars 44, 48. In other embodiments, the incorporated lift handles 36 may be die cast aluminum handles that are disposed around their respective top roll bars 44, 48. For example, FIG. 10 is a perspective view of a die cast aluminum bracket incorporated lift handle 36.

In general, the right and left top roll bars 44, 48 remain fixed with respect to the outer enclosure 50, whereas the incorporated lift handles 36 are free to rotate with respect to the outer enclosure 50. However, in certain embodiments, a stop mechanism (e.g., integrated into the top fastening mechanisms 80, 82, 84, 86) may be used to constrain rotation of a handle portion 120 of the incorporated lift handles 36 between the horizontal position adjacent to the top side 54 of the outer enclosure 50 (e.g., as illustrated in FIGS. 1-8) and a vertical position approximately 90 degrees from (i.e., perpendicular to) the top side 54 of the outer enclosure 50 (e.g., as illustrated in FIG. 9). In certain embodiments, the incorporated lift handles 36 may be constructed from the same materials (e.g., tubular aluminum) as the roll bars 42, 44, 46, 48, 62, 64, 66, 68 of the roll cage assembly 34.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply unit, comprising:
an outer enclosure having a plurality of sides that encompass internal components of the welding power supply unit;
a roll cage assembly having a plurality of roll bars, wherein each roll bar is disposed generally parallel with, but not adjacent to, an edge of a side of the outer enclosure and external to the outer enclosure, wherein at least two of the roll bars are associated with handle portions that rotate with respect to the respective roll bar; and
a plurality of fastening mechanisms attached to the outer enclosure, the fastening mechanisms securing the roll cage assembly to the outer enclosure.

2. The welding power supply unit of claim 1, wherein the roll bars comprise tubular members permanently fixed to one another to at least partially surround the outer enclosure.

3. The welding power supply unit of claim 1, wherein each handle portion comprises an extruded tubular aluminum bracket or a die cast aluminum bracket disposed around its respective roll bar.

4. The welding power supply unit of claim 1, comprising a stop mechanism configured to constrain rotation of a handle portion between a horizontal position adjacent to a top side of the outer enclosure and a vertical position generally perpendicular to the top side of the outer enclosure.

5. The welding power supply unit of claim 1, comprising a plurality of struts, each strut extending vertically along a lateral side of the outer enclosure between a fastening mechanism disposed on a top side of the outer enclosure and a fastening mechanism disposed on a bottom side of the outer enclosure.

6. The welding power supply unit of claim 5, wherein each strut comprises a rolled rib extending lengthwise along an outer surface of the strut.

7. The welding power supply unit of claim 6, wherein each of the lateral sides and top side of the outer enclosure comprise a plurality of rolled ribs extending lengthwise along an outer surface of the side.

8. The welding power supply unit of claim 1, wherein the roll cage assembly comprises:
a top roll cage section comprising a plurality of top roll bars, wherein each top roll bar is disposed generally parallel with, but not adjacent to, an edge of a top side of the outer enclosure and external to the outer enclosure; and
a bottom roll cage section comprising a plurality of bottom roll bars, wherein each bottom roll bar is disposed generally parallel with, but not adjacent to, an edge of a bottom side of the outer enclosure and external to the outer enclosure.

9. The welding power supply unit of claim 8, wherein each of the bottom roll bars of the bottom roll cage section are permanently fixed to an adjacent bottom roll bar via a transition joint that extends at a non-orthogonal angle with respect to the sides of the outer enclosure.

10. The welding power supply unit of claim 1, wherein each roll bar comprises a tubular aluminum structure.

11. A welding power supply unit, comprising:
an outer enclosure having a plurality of sides that encompass internal components of the welding power supply unit;
a roll cage assembly having a plurality of roll bars, wherein each roll bar is disposed generally parallel with, but not adjacent to, an edge of a side of the outer enclosure and external to the outer enclosure, wherein at least two of the roll bars are associated with handle portions that rotate with respect to the respective roll bar, wherein each handle portion comprises an extruded tubular aluminum bracket or a die cast aluminum bracket disposed around its respective roll bar; and
a plurality of fastening mechanisms attached to the outer enclosure, the fastening mechanisms securing the roll cage assembly to the outer enclosure.

12. The welding power supply unit of claim 11, wherein the roll bars comprise tubular members permanently fixed to one another to at least partially surround the outer enclosure.

13. The welding power supply unit of claim 11, comprising a stop mechanism configured to constrain rotation of a handle portion between a horizontal position adjacent to a top side of the outer enclosure and a vertical position generally perpendicular to the top side of the outer enclosure.

14. The welding power supply unit of claim 11, comprising a plurality of struts, each strut extending vertically along a lateral side of the outer enclosure between a fastening mechanism disposed on a top side of the outer enclosure and a fastening mechanism disposed on a bottom side of the outer enclosure.

15. The welding power supply unit of claim 14, wherein each strut comprises a rolled rib extending lengthwise along an outer surface of the strut.

16. The welding power supply unit of claim 15, wherein each of the lateral sides and top side of the outer enclosure comprise a plurality of rolled ribs extending lengthwise along an outer surface of the side.

17. The welding power supply unit of claim 11, wherein the roll cage assembly comprises:
a top roll cage section comprising a plurality of top roll bars, wherein each top roll bar is disposed generally parallel with, but not adjacent to, an edge of a top side of the outer enclosure and external to the outer enclosure; and a bottom roll cage section comprising a plurality of bottom roll bars, wherein each bottom roll bar is disposed generally parallel with, but not adjacent to, an edge of a bottom side of the outer enclosure and external to the outer enclosure.

18. The welding power supply unit of claim 17, wherein each of the bottom roll bars of the bottom roll cage section are permanently fixed to an adjacent bottom roll bar via a transition joint that extends at a non-orthogonal angle with respect to the sides of the outer enclosure.

19. A welding power supply unit, comprising:
an outer enclosure having a plurality of sides that encompass internal components of the welding power supply unit, wherein the plurality of sides comprise a plurality of lateral sides, a top side, and a bottom side, wherein each of the lateral sides and top side comprise a plurality of rolled ribs extending lengthwise along an outer surface of the side;
a roll cage assembly having a plurality of roll bars, wherein each roll bar is disposed generally parallel with, but not adjacent to, an edge of a side of the outer enclosure and external to the outer enclosure, wherein at least two of the roll bars are associated with handle portions that rotate with respect to the respective roll bar, wherein each handle portion comprises an extruded tubular aluminum bracket or a die cast aluminum bracket disposed around its respective roll bar;
a plurality of fastening mechanisms attached to the outer enclosure, the fastening mechanisms securing the roll cage assembly to the outer enclosure;
a plurality of struts, each strut extending vertically along a lateral side between a fastening mechanism disposed on the top side and a fastening mechanism disposed on the bottom side, wherein each strut comprises a rolled rib extending lengthwise along an outer surface of the strut; and
a stop mechanism configured to constrain rotation of a handle portion between a horizontal position adjacent to the top side and a vertical position generally perpendicular to the top side.

* * * * *